(12) United States Patent
Sekhar

(10) Patent No.: US 9,311,424 B2
(45) Date of Patent: Apr. 12, 2016

(54) HTTP REQUEST PIPELINE OPTIMIZATION

(75) Inventor: Vivek Sekhar, San Diego, CA (US)

(73) Assignee: Qualcomm Incorporated Center, Inc., San Diego, CA (US)

( * ) Notice: Subject to any disclaimer, the term of this patent is extended or adjusted under 35 U.S.C. 154(b) by 707 days.

(21) Appl. No.: 13/474,486

(22) Filed: May 17, 2012

(65) Prior Publication Data

US 2013/0311601 A1   Nov. 21, 2013

(51) Int. Cl.
*G06F 17/30* (2006.01)
*H04L 12/935* (2013.01)
*H04L 12/933* (2013.01)
*H04L 1/00* (2006.01)

(52) U.S. Cl.
CPC ...... *G06F 17/30899* (2013.01); *H04L 49/3063* (2013.01); *H04L 1/0052* (2013.01); *H04L 49/1546* (2013.01)

(58) Field of Classification Search
CPC ............ H04L 49/3063; G06F 17/30899
See application file for complete search history.

(56) References Cited

U.S. PATENT DOCUMENTS

| | | | |
|---|---|---|---|
| 6,728,748 B1 * | 4/2004 | Mangipudi et al. | 718/105 |
| 7,013,469 B2 * | 3/2006 | Smith | G06F 9/465 719/315 |
| 7,624,184 B1 * | 11/2009 | Aviani | H04L 67/2819 709/212 |
| 7,657,618 B1 * | 2/2010 | Rothstein et al. | 709/223 |
| 8,352,687 B2 * | 1/2013 | Dunn Berger | G06F 12/0831 711/140 |
| 8,447,905 B2 * | 5/2013 | Ambroladze | G06F 12/0811 710/240 |
| 8,667,120 B2 * | 3/2014 | Kurebayashi et al. | 709/224 |
| 8,996,819 B2 * | 3/2015 | Dunn Berger | G06F 12/0831 711/130 |
| 2003/0221000 A1 * | 11/2003 | Cherkasova et al. | 709/224 |
| 2005/0027788 A1 * | 2/2005 | Koopmans et al. | 709/200 |
| 2008/0155016 A1 * | 6/2008 | Tsai | 709/203 |
| 2009/0077233 A1 * | 3/2009 | Kurebayashi et al. | 709/224 |
| 2009/0088188 A1 * | 4/2009 | Wormald et al. | 455/466 |
| 2010/0318626 A1 * | 12/2010 | Abts | G06F 12/0813 709/216 |

OTHER PUBLICATIONS

Harchol-Balter, Mor, et al. "Size-based scheduling to improve web performance." ACM Transactions on Computer Systems (TOCS) 21.2 (2003): 207-233.*

* cited by examiner

*Primary Examiner* — Jimmy H Tran
(74) *Attorney, Agent, or Firm* — Neugeboren O'Dowd PC

(57) ABSTRACT

A computing device comprising a transmitter/receiver adapted to communicate with a network and an application adapted to send a plurality of object requests through the transmitter/receiver, wherein, the plurality of object requests are placed in an order dependent upon at least one of an object size and an object type.

16 Claims, 4 Drawing Sheets

HTTP REQUEST PIPELINE OPTIMIZATION

BACKGROUND OF THE INVENTION

1. Field of the Invention

This invention is related to the HTTP pipelining. Specifically, but not intended to limit the invention, embodiments of the invention are related to optimizing HTTP requests based on size and MIME type.

2. Relevant Background

HTTP pipelining is a technique in which multiple HTTP requests are written out to a single socket without waiting for the corresponding responses. HTTP requests sent to the socket without any knowledge on data size of the content being requested or without considering MIME type. As such, HTTP requests comprising a large content size may block the socket and make the download process slow for other requests in the pipeline. Similarly, downloading certain file types may slow the download process by preventing other, more critical file types from being downloaded.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

One embodiment of the invention comprises a computing device comprising, a transmitter/receiver adapted to communicate with a network; an application adapted to send a plurality of object requests through the transmitter/receiver, wherein, the plurality of object requests are placed in an order dependent upon at least one of, an object size; and an object type.

Another embodiment of the invention comprises a computing system comprising means for obtaining a file size of one or more digital objects, means for determining a file type of the one of more digital objects, means for requesting a first portion of the one or more digital objects on a first socket, wherein the first portion of the one or more digital objects comprises a first file size range, and means for requesting a second portion of the one or more digital objects on at least one second socket, wherein the second portion of the one or more digital objects comprises a second file size range.

Yet another embodiment of the invention comprises a method to optimize pipelining of HTTP requests. One such method comprises determining at least one of a file type and a file size for each of the HTTP requests. The method then comprises grouping the HTTP requests by at least one of the file type and the file size and issuing one or more first HTTP requests for a at least one first file type on one or more sockets. One or more second HTTP requests may also be issued for at least one second file type on the one or more sockets after the one or more first HTTP requests have been issued.

And yet another embodiment of the invention comprises a non-transitory, tangible computer readable storage medium, encoded with processor readable instructions to perform a method of optimize HTTP requests. One method of optimizing HTTP requests comprises determining a file size for an object being sought by each HTTP request, determining a file type for the object being sought by each HTTP request, sending a HTTP request for at least one first file type object, and sending a HTTP request for at least one second file type object after sending the HTTTP request for the at least one first file type object.

BRIEF DESCRIPTION ON THE DRAWINGS

DETAILED DESCRIPTION

Figure 1:
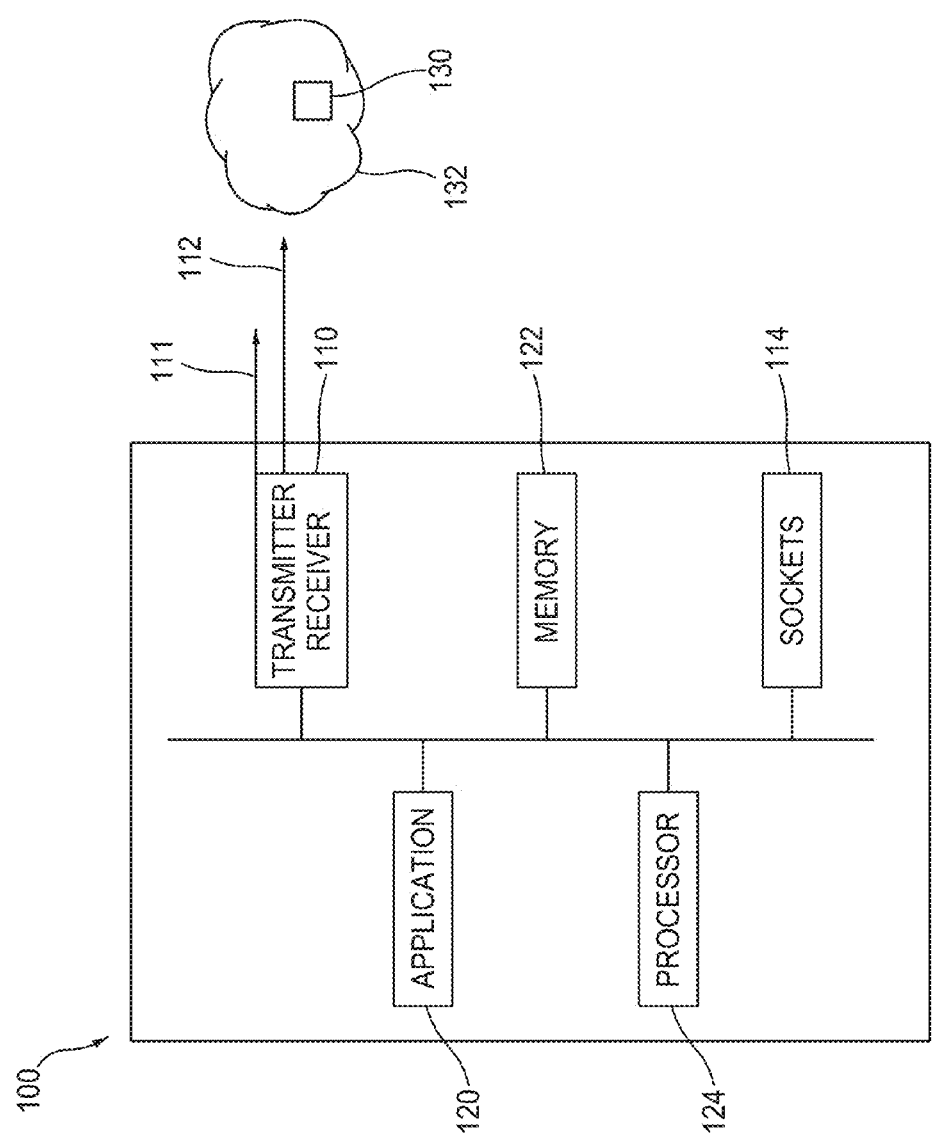
FIG. 1 illustrates a block diagram depicting components of a computing device.

Looking first at FIG. 1, seen is a computing device 100 comprising, a transmitter/receiver 110 and an application 120. The application 120 may be stored in a memory device 122 and a processor 124 may be used to perform operations defined by the application 120. The transmitter/receiver 110 may comprise a wireless communication device adapted to communicate with a network such as, but not limited to, a WiFi or cellular network. Other wired and wireless networks are contemplated.

In one embodiment, the application 120 may comprise an internet browser. However, the application 120 may also comprise other applications adapted to access a network are also contemplated. Furthermore, the application 120 may comprise a cloud-based application wherein one or more portions of the application 120 may reside on a network host or other network-based device. Regardless of the type of application 120, the application 120 may be adapted to send a plurality of object requests 112 to a network device 130 residing on a network 132 and through the transmitter/receiver 110. In one embodiment, the application 120 may be adapted to send the plurality of object requests 112 in a specified order. It is contemplated that the term plurality of object requests 112 may be referred to throughout the specification and claims as "requests 112" and/or a "request 112". In one embodiment, the object requests 112 may be issued in an order dependent upon a size of the object requested and/or a MIME type of the object requested.

For example, in one embodiment where the application 120 may comprise a web browser, the application 120 may issue one or more requests 112 for objects comprising JavaScripts, cascading style sheets (CSS), images, and audio/video files. In such an embodiment, the application 120 may prioritize the requests 112 so that the images files, or some of the image files, are requested after the cascading style sheets and JavaScripts are requested, and the audio/video files are requested after the images. The JavaScripts may be requested prior to the CSS files. The application may determine the object type for each of the requests 112 by sending an initial request 111 to the network device 130 or other device location on the network 132. Alternatively, or in combination, information provided to the application 120 initiating the application 120 to request 112 the objects may comprise the object type. For example, a URL may include an object type. In such cases, the initial request 111 may not be issued for the object type.

In addition, or alternatively, to requesting the objects based on the object type, the application may also request 112 the objects based on object size. In one such embodiment, objects having smaller file sizes may be requested before objects having larger file sizes. In one example, the application 120 may comprise a web browser requesting to view a web page comprising at least one JavaScript and at least one cascading style sheet (css). One of the at least one JavaScript and the at least one cascading style sheet may comprise a first object size. Another of the at least one JavaScript and at least one cascading style sheet may comprise a second object size. The second object size may be greater than the first object size. In such an embodiment, the order of the plurality of requests 112 may comprise issuing a request for the at least one JavaScript and at least one cascading style sheeting having a first object size before issuing the request for the at least one JavaScript and at least one cascading style sheet having a second object size.

Similarly, in requesting at least one image, the at least one image may comprise a first image having a first image file size and at least one second image having a second image file size. The second image file size may be larger than the first image file size, and the order may further comprise requesting the first image object before the second image object. In other embodiments, the computing device 100 may only use the object file size to determine the order of issuing the requests 112. In such an embodiment, the small image files may be requested prior to the small css or JavaScript files, if the file size of small image files is less than the file size of the css and JavaScript files. It is further contemplated that the plurality of object requests 112 may comprise a plurality of HTTP requests.

In one embodiment, the computing device 100 may further comprise a plurality of network sockets 114. The plurality of network sockets 114 may also be referred to as network sockets 114 or sockets 114 throughout the specification and claims. Similarly, non-plural use may also be incorporated throughout the specification and claims. The sockets 114 may comprise a portion of the transmitter/receiver 110, but are shown separately in FIG. 1 for the sake of clarity. In such an embodiment, and in other embodiments, the application 120 may provide a file size configuration setting. With such a setting, a user and/or developer may establish a desired object file size socket setting. The setting may establish the object size for which the application 120 may request the object across a new, or its own, network socket 114. For example, the setting may be set for a particular web page at 5 MB. With such a setting, any object having a file size of 5 MB or above may be requested across its own socket 114. Such a request 112 may comprise a request for a first object. The remainder of the plurality of object requests 112 for objects under the file size configuration setting of, for example, 5 MB, may comprise requests 112 for a plurality of second objects. The request for the first object is sent from a first of the plurality of sockets 114 and each requests 112 for the plurality of second objects may be sent from a separate second of the plurality of sockets 114.

Determining the file size may also occur through the use of the initial request 111. For example, upon determining that an object is needed, the application 120 may issue the initial request 111 to the network device 130, wherein the initial request may comprise a request for an object size and/or a file type. The network device 130 may respond to the computing device 100 with the object size and/or type.

Figure 2:
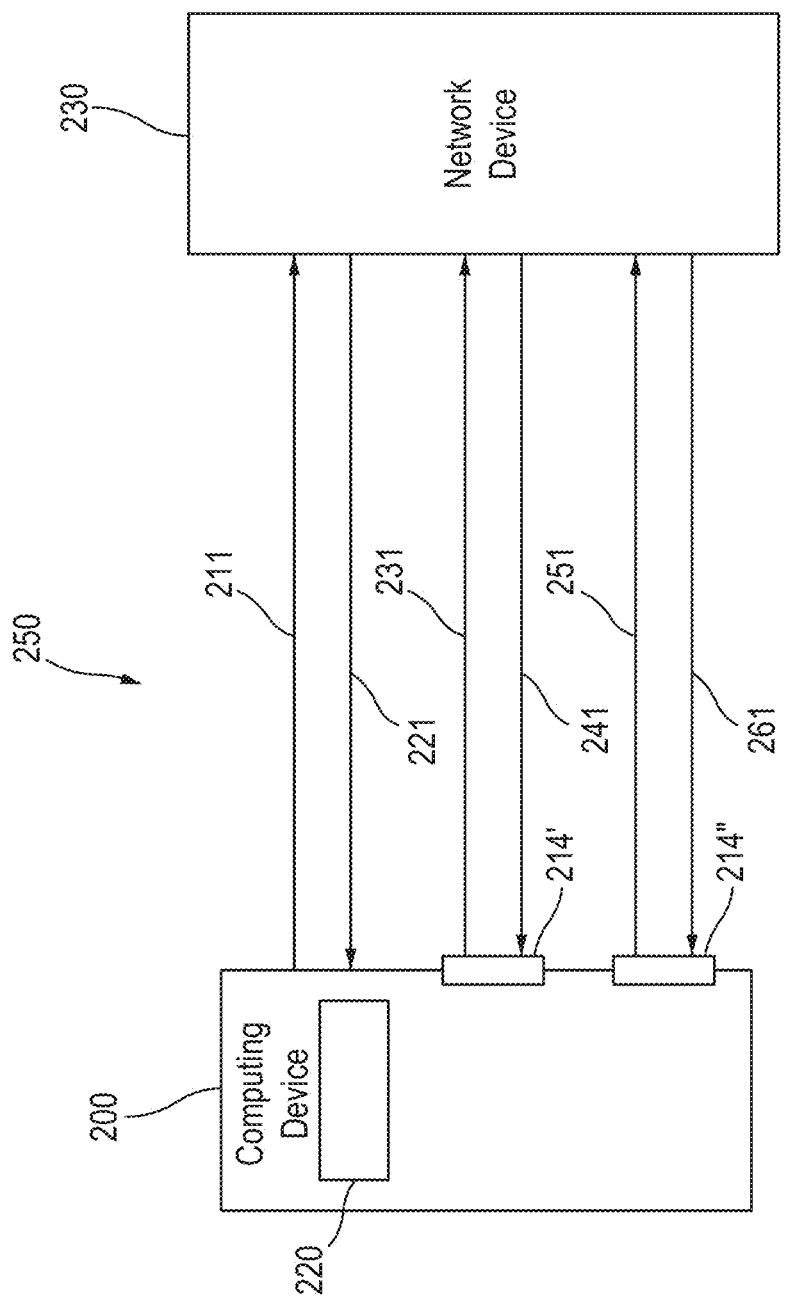
FIG. 2 illustrates communication between a computing device and a network device.

Turning now to FIG. 2, seen is a computing system 250. One computing system 250 comprises a computing device 200 and a network device 230. The computing system 250 comprises a means for obtaining a file size of one or more digital objects and a means for determining a file type of the one of more digital objects. For example, as discussed above, the computing device 200 may issue one or more initial requests 211 comprising a request for one or more object types and object file sizes. The one or more initial request 211 may be sent when, for example a user desires to access a web site through a web browser application and the web browser requests the objects comprising the web site. Upon receiving the one or more initial requests 211, the network device 230 may issue an initial response 221 providing the computing device 200 with the requested data of the file size and/or file type. In one embodiment, the one or more initial requests 211 for obtaining a file size and/or an object type of one or more digital objects may comprise issuing a HEAD request to the network device 230.

The system 250 seen in FIG. 2 may further comprise a means for requesting a first portion of the one or more digital objects on a first socket 214'. In one embodiment, the first portion of the one or more digital objects comprises a first file size range. For example, the first portion of the one or more digital objects may comprise all objects comprising less than a 5 MB file size. As seen in FIG. 2, the first socket 214' may be used to issue one or more first socket requests 231 for the first portion of the one or more digital objects under 5 MB in size. The system 250 may determine which of the one or more digital objects are placed into the first portion of the one or more digital objects by first determining the size of each of the one or more digital objects. The first socket requests 231 may comprise pipelined requests for multiple objects. Similarly, a response 241 comprising a single response or multiple responses may be received for each object. Upon receiving the response 241, the first socket 214' may issue the subsequent first socket request 231 pending in the queue. In one embodiment, the smallest of the object file sizes may be requested first and each subsequent may be issued for an increasing larger file size. Alternatively, requests for JavaScript and css files may be issued first, with requests for the smallest of these files being issued first and the each subsequent request being for a larger JavaScript and/or css file. Upon all JavaScript and/or css files being requested and received, the smallest image file may be requested, with each subsequent request being for a larger image file size.

The system 250 may further comprise a means for requesting a second portion of the one or more digital objects on at least one second socket 214". In one embodiment, the second portion of the one or more digital objects may comprise a second file size range. In other embodiments, separate sockets 214 may also be used for each file type and/or file size ranges of each file type. When the at least one second socket 214" is used for a second file size range, the at least one second socket 214" may be used to send a request 251 and receive a response 261 for all large objects. The range of file sizes that may be used by the at least one second socket 214" may be set by the user in the application 220 by a user and/or developer and in one embodiment may comprise all object sizes not included in the first socket 214'. When there are multiple large objects, a single at least one second socket 214" may be used for each large object, so multiple second sockets may be used. Therefore, each large object may have its own socket 214". In one embodiment, requests 251 for objects comprising file sizes greater than 5 MB may be used on the at least second socket 214". Additionally, the means for requesting the at least one JavaScript and at least one cascading style sheet before requesting the at least one image may comprise the application sending a request for the JavaScript and css before the image file types. Other file types are also contemplated herein and this disclosure is in no way to be construed limiting the order or size of file types to the exact types discussed herein.

Figure 3:
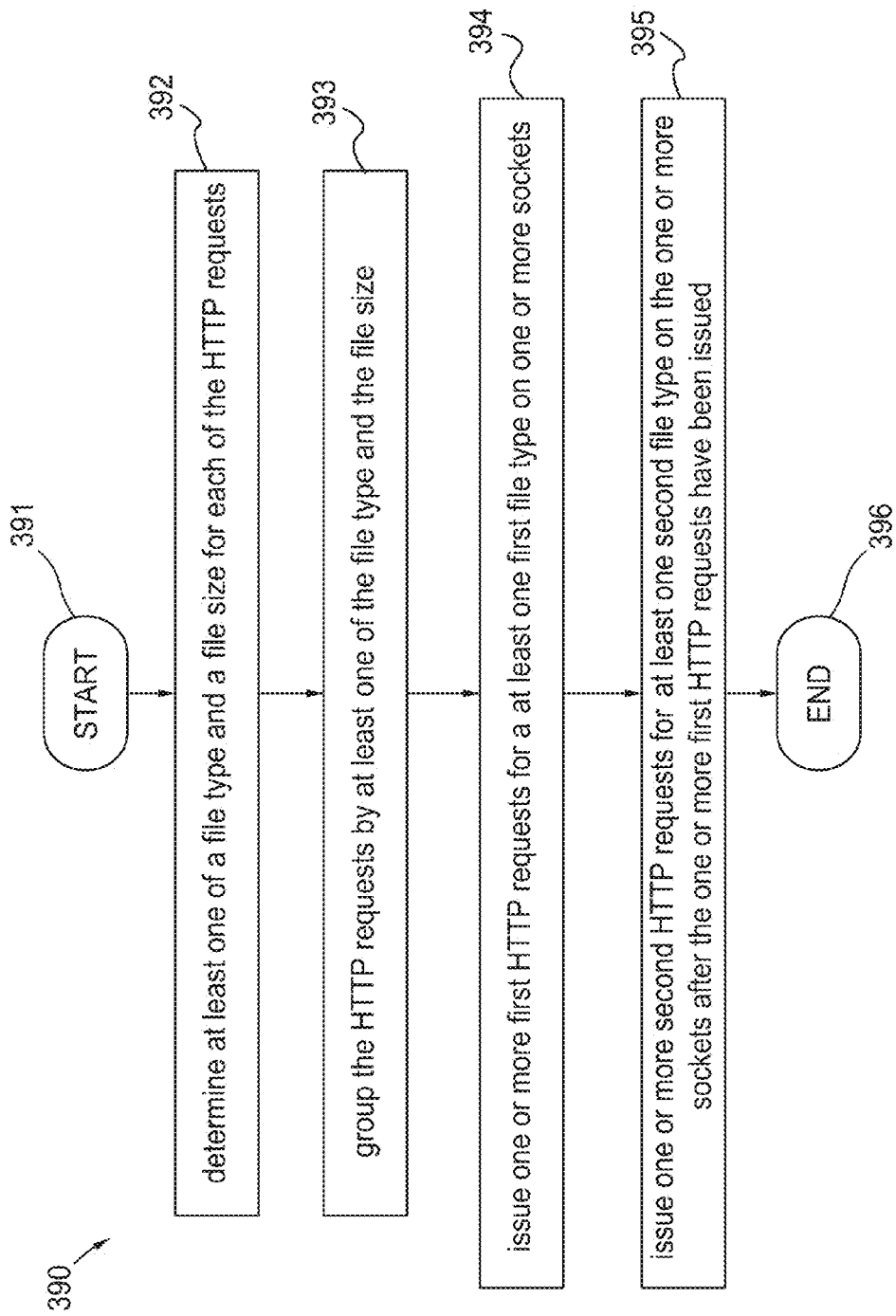
FIG. 3 illustrates a flowchart that depicts a method that may be carried out in connection with the embodiments described herein.

Turning now to FIG. 3, seen is a method 390 to optimize pipelining of HTTP requests. One method 390 starts at 391 and at 392 comprises determining at least one of a file type and a file size for each of the HTTP requests. As discussed previously, the file type and a file size may be determine through issuing the initial request 111, 211 seen in FIGS. 1 and 2. Returning now to FIG. 3, at 393, the method 390 comprises grouping the HTTP requests by at least one of the file type and the file size. For example, as discussed above with reference to FIG. 2, first socket requests 231 sent over the first socket 214' may comprise first socket requests 231 for objects less than 5 MB in size while requests 251 over the at least one second socket 214" may comprise requests 251 for objects greater than 5 MB in size.

Returning once again to FIG. 3, at 394 the method 390 comprises issuing one or more first HTTP requests for at least one first file type on one or more sockets. The first socket requests 231 251 on sockets 214 in FIG. 2 may comprise one or more first HTTP requests for a first file type comprising one of JavaScripts, ccs, and images. And at 395 in FIG. 3 the method 390 comprises issuing one or more second HTTP requests for at least one second file type on the one or more sockets after the one or more first HTTP requests have been issued. Similar to step 394, the other of the first socket requests 231 not comprising the first HTTP requests may comprise the second HTTP requests for at least one second file type. The second file type may comprise one of JavaScripts, css, and images not comprising the first file type. The method 390 ends at 396.

In one embodiment, the one or more first HTTP requests comprises requesting a smaller file size of the at least one first file type before requesting a larger file size of the at least one first file type. Additionally, the one or more second HTTP requests may comprise requesting a smaller file size of the at least one second file type before requesting a larger file size of the at least one second file type.

Though not seen in FIG. 3, it is contemplated that one method 390 may comprise receiving one or more first files comprising the at least one first file type and receiving one or more second files comprising the at least one second file type. For example, in one of the responses 241, 251, the computing device 200 of FIG. 2 may receive at least one first file type and in the other of the responses 241, 251 the computing device 200 may receive the at least one second file type. The at least one first file type may comprise at least one of a JavaScript and a cascading style sheet while the at least one second file type may comprise an image.

Figure 4:
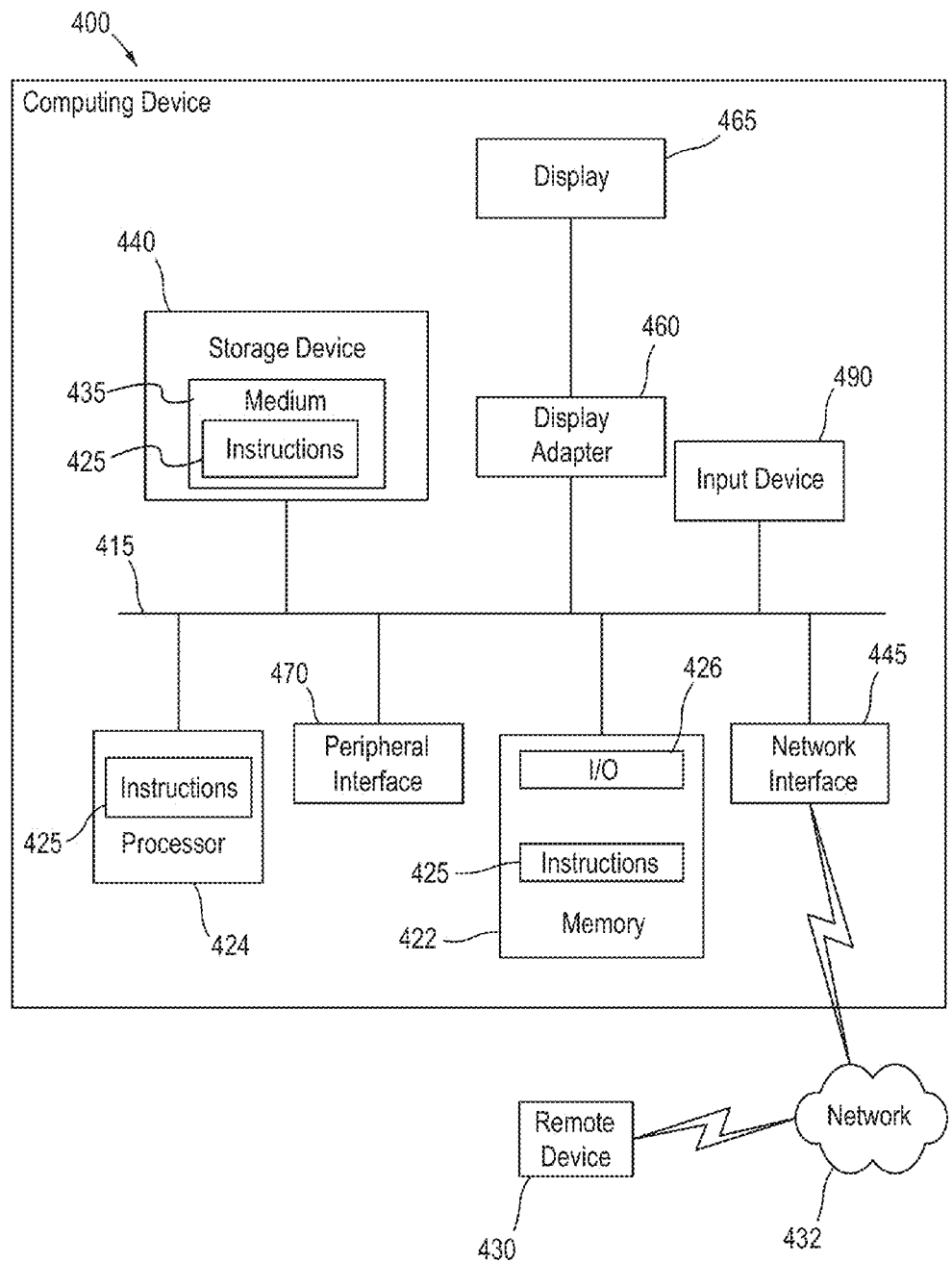
FIG. 4 illustrates a block diagram depicting components of a computing device.

Turning now to FIG. 4, shown is a diagrammatic representation of one embodiment of a machine in the exemplary form of the computing device 400 within which a set of instructions for causing a device to perform any one or more of the aspects and/or methodologies of the present disclosure to be executed.

Computing device 400 includes the processor 424, which communicates with the memory 422 and with other components, via the bus 415. Bus 415 may include any of several types of bus structures including, but not limited to, a memory bus, a memory controller, a peripheral bus, a local bus, and any combinations thereof, using any of a variety of bus architectures.

Memory 422 may include various components (e.g., machine readable media) including, but not limited to, a random access memory component (e.g., a static RAM "SRAM", a dynamic RAM "DRAM, etc.), a read only component, and any combinations thereof. In one example, a basic input/output system 426 (BIOS), including basic routines that help to transfer information between elements within computing device 400, such as during start-up, may be stored in memory 422. Memory 422 may also include (e.g., stored on one or more machine-readable media) instructions (e.g., software) 425 which may comprise the application 120 seen in FIG. 1, the instructions 425 embodying any one or more of the aspects and/or methodologies of the present disclosure. In another example, memory 422 may further include any number of program modules including, but not limited to, an operating system, one or more application programs, other program modules, program data, and any combinations thereof.

Computing device 400 may also include a storage device 440. Examples of a storage device (e.g., storage device 440) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 440 may be connected to bus 415 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 440 may be removably interfaced with computing device 400 (e.g., via an external port connector (not shown)). Particularly, storage device 440 and an associated machine-readable medium 435 may provide nonvolatile and/or volatile storage of machine-readable instructions, data structures, program modules, and/or other data for computing device 400. In one example, instructions 425 may reside, completely or partially, within machine-readable medium 435. In another example, instructions 425 may reside, completely or partially, within processor 424.

Computing device 400 may also include an input device 490. In one example, a user of computing device 400 may enter commands and/or other information into computing device 600 via input device 490. Examples of an input device 490 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 490 may be interfaced to bus 415 via any of a variety of interfaces (not shown) including, but not limited to, a serial interface, a parallel interface, a game port, a USB interface, a FIREWIRE interface, a direct interface to bus 415, and any combinations thereof.

A user may also input commands and/or other information to computing device 400 via storage device 440 (e.g., a removable disk drive, a flash drive, etc.) and/or a network interface device 445 which may comprise the transmitter/receiver 110. In one embodiment, the transmitter/receiver 110 comprises a wireless transmitter/receiver. A network interface device, such as network interface device 445 may be utilized for connecting computing device 400 to one or more of a variety of networks, such as network 430, and one or more remote devices 430 connected thereto. Examples of a network interface device include, but are not limited to, a network interface card, a modem, and any combination thereof. Examples of a network or network segment include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. A network, such as network 432, may employ a wired and/or a wireless mode of communication. In general, any network topology may be used. Information (e.g., data, software 625, etc.) may be communicated to and/or from computing device 400 via network interface device 445.

Computing device 400 may further include a video display adapter 460 for communicating a displayable image to a display device, such as display device 465. A display device may be utilized to display any number and/or variety of indicators related to pollution impact and/or pollution offset attributable to a consumer, as discussed above. Examples of a display device include, but are not limited to, a liquid crystal display (LCD), a cathode ray tube (CRT), a plasma display, and any combinations thereof. In addition to a display device, a computing device 400 may include one or more other peripheral output devices including, but not limited to, an audio speaker, a printer, and any combinations thereof. Such peripheral output devices may be connected to bus 415 via a peripheral interface 470. Examples of a peripheral interface include, but are not limited to, a serial port, a USB connection, a FIREWIRE connection, a parallel connection, and any combinations thereof. In one example an audio device may provide audio related to data of computing device 400 (e.g., data representing an indicator related to pollution impact and/or pollution offset attributable to a consumer).

A digitizer (not shown) and an accompanying stylus, if needed, may be included in order to digitally capture freehand input. A pen digitizer may be separately configured or coextensive with a display area of display device 465. Accordingly, a digitizer may be integrated with display device 465, or may exist as a separate device overlaying or otherwise appended to display device 465.

For example, the medium 435 may comprise a non-transitory, tangible computer readable storage medium, encoded with processor readable instructions to perform a method of optimizing HTTP requests. One such method may comprise determining a file size for an object being sought by each HTTP request, determining a file type for the object being sought by each HTTP request, sending a HTTP request for at least one first file type object, and sending a HTTP request for at least one second file type object after sending the HTTTP request for the at least one first file type object.

It is further contemplated that the medium 435, encoded with processor readable instructions to perform a method of optimizing HTTP requests may comprise determining a file size for the object being sought by each HTTP request and determining a file type for the object being sought by each HTTP request. Furthermore, a HTTP request may be sent for at least one first file type object a HTTP request may be sent for at least one second file type object after sending the HTTTP request for the at least one first file type object.

The medium 435 may further comprise receiving the at least one first type object before receiving the at least one second file type object. Furthermore, sending a HTTP request for at least one first file type object may comprise sending a plurality of HTTP requests for at least one first file type object. The plurality of HTTP requests may comprise a first HTTP request for a first file type object having a first file size and at least one second HTTP request for a second file type object having a second file size being sent after the first HTTP request, wherein the second file size is greater than the first file size. Additionally, the at least one first file type object may comprise a JavaScript and a cascading style sheet and the at least one second file type object may comprise an image.

In conclusion, embodiments of the present invention comprise embodiments of optimizing HTTP requests. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A client computing device comprising,
    a hardware transmitter/receiver adapted to communicate with a network;
    an application within a web browser, comprising program instructions stored on a memory and executed by a hardware processor on the client computing device, adapted to:
        send a plurality of first HTTP HEAD object requests through a first socket of the web browser, via the transmitter/receiver,
        receive information at the client computing device regarding at least one of an object size and an object type for each of a plurality of objects,
        place a plurality of second HTTP object requests in a pipelined order for sending from the first socket of the client computing device,
        wherein, the plurality of second HTTP object requests comprise download requests, and are placed in a pipelined order dependent upon at least one of,
        the object size; and
        the object type.

2. The client computing device of claim 1 wherein,
    the object type comprises at least one of,
        at least one JavaScript,
        at least one cascading style sheet, and
        at least one image; and
    the order of the plurality of second HTTP object requests comprises,
        a request for the at least one JavaScript before a request for the at least one cascading style sheet,
        a request for the at least one cascading style sheet prior to a request for the image, and
        a request for the image before a request for at least one video or audio file.

3. The client computing device of claim 2 wherein,
    the at least one JavaScript and at least one cascading style sheet comprise,
        at least one JavaScript and cascading style sheet having a first object size, and
        at least one JavaScript and cascading style sheet having a second object size, wherein the second object size is greater than the first object size; and
    the order further comprises, a request for the at least one JavaScript and cascading style sheeting having a first object size before a request for the at least one JavaScript and cascading style sheet having a second object size.

4. The client computing device of claim 2 wherein,
    the at least one image comprises a first image having a first image file size and a second image having a second image file size;
    the second image file size is larger than the first image file size; and
    the order further comprises a request for the first image before a request for the second image.

5. The client computing device of claim 1 further comprising a plurality of sockets; and wherein,
    the first socket has an upper threshold object size setting,
    one or more responses to the plurality of first HTTP HEAD requests indicates that at least one first object has an object size under the upper threshold object size and at least one second object has an object size exceeding the upper threshold object size setting, and one or more of the plurality of second HTTP object requests comprises a request for the first object via the first socket of the client computing device, and one or more of the plurality of second HTTP object requests comprises a request for the second object via a second socket of the client computing device.

6. A client computing system comprising program instructions stored on memory and executed by a hardware processor, which cause the system to, send a plurality of first HTTP HEAD requests from the client computing device to obtain a file size and type of one or more digital objects;

detect, at the client computing device, the file size and file type of the one or more digital objects for which the plurality of first HTTP HEAD requests were sent;

order a plurality of second HTTP requests to be sent from a first socket of the client computing device based on one or more of the file size and the file type;

set an upper threshold for a digital object size that may be requested via a second HTTP request on a first socket of the client computing device;

send at least one second HTTP request on a second socket of the client computing device for a digital object that exceeds the upper threshold for a digital object size.

7. The system of claim 6, wherein the upper threshold for a digital object size that may be requested via a second HTTP request on a first socket is configurable by an end user of a client device.

8. The system of claim 6 wherein, the file type of the one or more digital objects comprises at least one
JavaScript,
cascading style sheet, and
image; and wherein the system requests the at least one JavaScript and at least one cascading style sheet before requesting the at least one image.

9. A method to optimize pipelining of HTTP requests comprising, determining, by sending a plurality of first HTTP HEAD requests from a client computing device, at least one of a file type and a file size of a plurality of digital objects;

grouping a plurality of second HTTP requests at the client computing device by at least one of the file type and the file size to be sent from a first socket, wherein the plurality of second HTTP object requests comprise download requests;

issuing one or more second HTTP requests for at least one first file type on the first socket of the client computing device; and issuing one or more second HTTP requests for at least one second file type on a second socket of the client computing device.

10. The method of claim 9, further comprising, receiving one or more first files comprising the at least one first file type; and receiving one or more second files comprising the at least one second file type.

11. The method of claim 9 wherein, the at least one first file type comprises at least one of a JavaScript and a cascading style sheet; and the at least one second file type comprises an image.

12. A non-transitory, tangible computer readable storage medium, encoded with processor readable instructions to perform a method of optimize HTTP requests comprising, determining, by sending a plurality of first HTTP HEAD requests from a client computing device, at least one of a file type and a file size of a plurality of digital objects;

grouping a plurality of second HTTP requests at the client computing device by at least one of the file type and the file size to be sent from a first socket, wherein the plurality of second HTTP object requests comprise download requests;

issuing one or more second HTTP requests for at least one first file type on the first socket of the client computing device; and issuing one or more second HTTP requests for at least one second file type on a second socket of the client computing device.

13. The non-transitory, tangible computer readable storage medium of claim 12, further comprising, receiving the at least one file type object before receiving the at least one second file type object.

14. The non-transitory, tangible computer readable storage medium of claim 12, wherein, sending a HTTP request for at least one first file type object comprises sending a plurality of HTTP requests for at least one first file type object; and the plurality of HTTP requests comprise, a first HTTP request for a first file type object having a first file size, and at least one second HTTP request for a second file type object having a second file size being sent after the first HTTP request, wherein the second file size is greater than the first file size.

15. The non-transitory, tangible computer readable storage medium of claim 12 wherein, the at least one first file type object comprises a JavaScript and a cascading style sheet; and the at least one second file type object comprises an image.

16. The non-transitory, tangible computer readable storage medium of claim 12 wherein, the file type comprises the MIME type.

* * * * *